(12) United States Patent
Pettersson et al.

(10) Patent No.: US 6,550,003 B1
(45) Date of Patent: Apr. 15, 2003

(54) NOT REPORTED JUMP BUFFER

(75) Inventors: Hans Christian Pettersson, Göteborg (SE); Pär David Berglin, Malmö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/479,954

(22) Filed: Jan. 10, 2000

(30) Foreign Application Priority Data

Jan. 11, 1999 (SE) .............................. 9900042

(51) Int. Cl.[7] ................................. G06F 9/38
(52) U.S. Cl. ...................... 712/218; 712/234
(58) Field of Search .................. 712/218, 234

(56) References Cited

U.S. PATENT DOCUMENTS

| 5,121,473 A | | 6/1992 | Hodges ................. 395/375 |
| 5,765,016 A | | 6/1998 | Walker ................. 39/800.23 |
| 5,778,245 A | | 7/1998 | Papworth et al. ...... 395/800.23 |
| 5,805,853 A | * | 9/1998 | White et al. ............. 712/218 |
| 5,918,046 A | * | 6/1999 | Hoyt et al. .............. 712/239 |
| 6,112,019 A | * | 8/2000 | Chamdani et al. ........ 712/23 |

FOREIGN PATENT DOCUMENTS

| EP | 0 685 789 A2 | 12/1995 |
| EP | 0 731 408 A2 | 9/1996 |

OTHER PUBLICATIONS

Pihlgren, O., International-Type Search Report, Search Request No. SE99/00016, Nov. 19, 1999, pp. 1–4.

* cited by examiner

*Primary Examiner*—William M. Treat
(74) *Attorney, Agent, or Firm*—Jenkens & Gilchrist, P.C.

(57) ABSTRACT

The present invention achieves a fast handling of the predicted jumps by introducing an additional buffer (20) for not reported predicted jump instructions in a reorder buffer. This additional buffer (20) is separate from the main buffer (10) and in supplied only with information associated with instructions related to predicted jumps. A predicted jump instruction is preferably stored both in the main buffer (10) and the additional buffer (20). The additional buffer operates in parallel with the main buffer (10) and in designed as a linear first-in-first-out queue. The first not reported jump is then always easily available at the top of the queue for evaluating the jump conditions. If a mispredicted jump is determined, the reorder buffer is flushed by a flush generator unit (42).

22 Claims, 7 Drawing Sheets

NOT REPORTED JUMP BUFFER

TECHNICAL FIELD

The present invention relates to the field of processors and in particular to reorder buffers in superscalar processors using out-of-order execution.

TECHNICAL BACKGROUND

In order to increase the capability of modern processors, the development is directed to solutions, where the processors execute several tasks in parallel. A superscalar processor handles more than one instruction each cycle. The reason for this development is that the speed of accessing memories has not increased in the same rate as the increased processor speed. With parallelism, more accesses can be done and even if the delay of each access is the same, more accesses can still be done over the same period of time.

The handling of large number of concurrently executed instructions has large benefits. Some of the benefits are pronounced when also using out-of-order execution, which nowadays often is employed. If an instruction has to wait for its operands a long time other instructions behind, which already have its operands ready can be executed while the first instruction waits for operands. This reduces the impact of a slow memory and maintains a higher throughput of instructions.

When using out-of-order execution, different hazards may occur. In such cases, a reorder buffer is introduced to keep track on the instructions, their results, their internal dependencies and order them in a proper program sequence.

In a superscalar processor according to prior art, predicted jumps are often used. A jump instruction may be conditioned on a certain result of another instruction, and the definite jump will not be possible to perform if the result is not available. However, if the jump instructions have to wait for the previous result to be ready for a long time, the overall speed of the processor is reduced. In order to speed up the process, the processor makes a prediction of whether the jump is going to be taken or not, and the subsequent instructions may be executed based on this. If the predicted jump was found to be correct at a later occasion, when the real result upon which the jump decision has to be made is available, the process may be continued from the point it had reached in the meantime. If the predicted jump was mispredicted, the processor has to start all over from the jump instruction and take the other path after the mispredicted jump. This means that all the instructions that are stored in the reorder buffer and other modules following the mispredicted jump instruction, have to be flushed. The probability for a correct prediction is much larger than a misprediction, so that the gain in time and reduced complexity by letting the execution continue past a predicted jump is larger than the loss caused by a flush and related actions.

In reorder buffers according to the state of the art, the processor stores all instructions in a main buffer together with associated information, e.g. concerning reading and writing addresses, sequence number etc. The main reorder buffer is normally arranged as a first-in-first-out queue in order to keep the original sequence order. The instructions are executed, and the results are temporarily stored in the reorder buffer. When the instructions have reached the first position of the buffer, i.e. when all earlier instructions are removed, a check, that the instruction is executed and that all results are normal and can be written into intended storage, is performed, the results are subsequently written into appropriate positions and the instruction is removed from the reorder queue. This procedure is known as committing the instruction.

Since a mispredicted jump instruction may cause an extensive loss of executed instructions, the evaluation of predicted jumps is requested to be performed as quickly as possible. The information stored together with the first not reported predicted jump has to be extracted from the main buffer. This information is then evaluated by the jump result that is received from the Arithmetic Logic Unit (ALU) and reported. If the prediction was correct, a flag is set in the main buffer that the predicted jump is reported to be correct and the processor searches for the next "not reported jump". On the contrary, if the prediction was wrong, a flush signal is sent to the processor. The processor favours the evaluation of the jumps but has the disadvantage of introducing a search procedure in the main buffer. When designing processors, the problem with this solution is that the extraction of information takes too long time, in particular with a large reorder buffer and when the processor runs at a high clock speed. This means that the mispredicted jumps are then followed by too many executed instructions before they are evaluated. Since the evolution of processors tends to increase the clock speed of the processor as well as the size of the reorder buffer, there is a general problem to reduce the time and efforts for predicted jump evaluation.

DESCRIPTION OF THE INVENTION

It is a general object of the present invention to reduce the time used for evaluation of predicted jumps in a reorder buffer. It is also an object of the present invention to achieve such time reductions with as limited additional hardware means as possible, preferably less.

The above objects have been achieved by a device and method according to the accompanying claims.

In general words, the present invention has solved the problem to achieve a fast handling of the predicted jumps by introducing a separate buffer for not reported predicted jump instructions in the reorder buffer. This buffer is separate from the main buffer and contains only instructions related to predicted jumps. A predicted jump instruction is preferably stored both in the main buffer and the additional buffer. This "not reported jump queue" operates in parallel with the main buffer and in designed as a linear first-in-first-out queue. The first not reported jump is then always easily available at the top of the queue and may be evaluated and reported very rapidly.

BRIEF DESCRIPTION OF THE DRAWINGS

The invention is described in more detail below in connection with the enclosed drawings, in which.

DETAILED DESCRIPTION OF THE PREFERRED EMBODIMENTS

Figure 1:
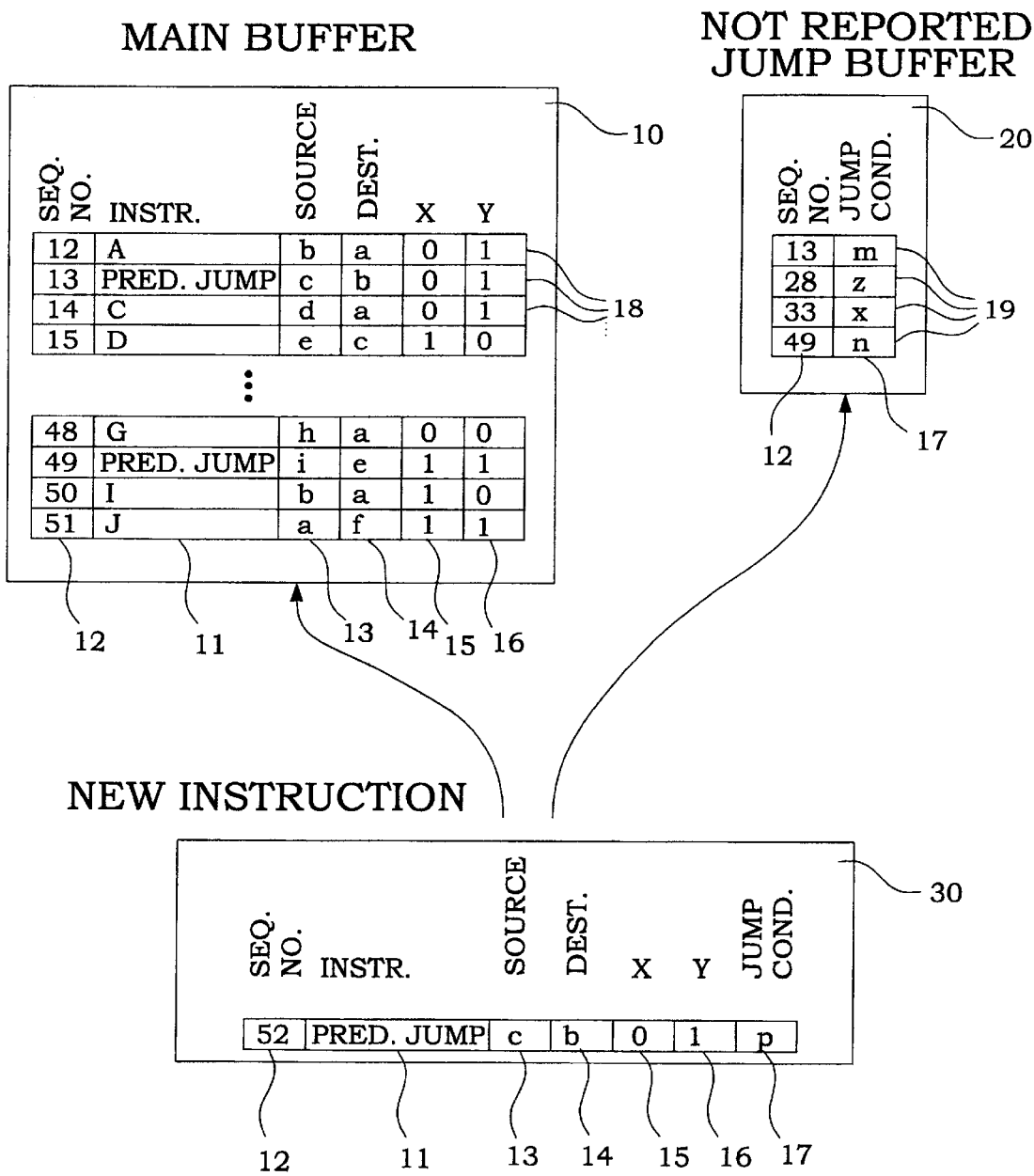
FIG. 1 is a schematic illustration of the distribution of instruction information according to the present invention.

In FIG. 1, the instruction information flow in a reorder buffer according to the present invention is illustrated. A reorder buffer according to the present invention comprises a main buffer 10, in which instructions and associated information is stored. The instructions are identified and ordered by a tag, hereinafter referred to as the sequence number. The reorder buffer according to the present invention also comprises an additional buffer 20, hereinafter referred to as a "not reported jump buffer", in which the sequence numbers of predicted jump instructions are stored, preferably together with selected associated information. The main buffer 10 contains a number of positions 18, in which information about instructions are to be placed. One buffer position 18 is intended for one instruction. Each buffer position 18 has a number of fields 11–16 in which information associated to the instruction can be stored. The not reported jump buffer 20 comprises in a similar manner a number of jump buffer positions 19, which preferably is less than the number of positions 18 in the main buffer. Each jump buffer position has a number of fields, a part of which may be a subset of the fields of the main buffer positions. Both buffers are normally designed as first-in-first-out (FIFO) queues, which means that the entries of information determines the order in which the information leaves the buffers.

Information 30 concerning a new instruction is sent to the reorder buffer. The information normally comprises the actual instruction 11 or a tag to or another representation of the instruction, and the sequence number 12, which indicates the order in which the instructions 11 are to be committed. Associated information may also comprise fields indicating data sources 13, i.e. which variables or memory contents that should be used as operands of the instruction, result destination 14, i.e. where the result from the instruction is going to be stored, and other important information. For a predicted jump instruction, the predicted condition for the jump may be included, either as a part of the instruction or as separate information. If the jump is of the form of "Branch if not equal to zero", the condition for the jump is obvious from the instruction itself and no further information has to be stored. The information 30 about the new instruction is added to the first available position in the main buffer 10 at the end of the FIFO queue. If the new instruction is a predicted jump, information is also supplied to the not reported jump buffer 20. Preferably, the sequence number 11 and information about the predicted condition for the jump 17 is stored at the first available position in the not reported jump buffer 20. Since all evaluation of predicted jumps are going to be performed from the not reported jump buffer, the information about the predicted jumps may be minimised in the main buffer, and thereby reduce the necessary available space.

In order to evaluate the first not reported predicted jump instruction, which is hidden somewhere in the main buffer 10, the first position in the not reported jump buffer 20 is selected. This first jump instruction is evaluated and reported. In the present invention, no report flag has to be set in the main buffer 10, the instruction just has to be removed from the not reported jump buffer 20. The correctly predicted jump instruction is thus removed from the not reported jump buffer 20 and the not reported jump buffer 20 is popped, i.e. all positions are moved forward one step. When the not reported jump buffer 20 is popped, the next instruction in the not reported jump buffer 20 is ready to be evaluated. If a misprediction is found, a flush signal has to be sent as soon as possible, removing all instructions, with a higher sequence number than the mispredicted jump, from the main buffer 10 as well as the not reported jump buffer 20.

The time for evaluation and extraction of crucial information reduces considerably using such a separate queue for predicted jump instructions, since the first instruction in the queue always is the next one to be treated, and no searching in a large buffer has to be performed.

This proposed method according to the present invention may involve the creation of an extra copy of some information, since it may appear both in the main buffer 10 and in the not reported jump buffer 20, even if the amount of the copied information is limited. However, if the number of positions and fields in the not reported jump buffer 20 is kept low, this extra storage only takes a small amount of extra area. This extra area used is often negligible in comparison with the logic needed for searching the main buffer 10 for information and the space omitted in the main buffer 10. In certain processors, the space reduction of the main buffer 10, arising from the possibility to omit some predicted jump information, may alone be larger than the space required by the additional not reported jump buffer.

The present inventions thus provides a method which performs predicted jump evaluation and reports very quickly, which implies that any execution of instructions after a mispredicted jump is reduced, and the over-all process time is shortened. The method is generally applicable to all processors using jump prediction.

In the following, a presently preferred embodiment of the present invention will be described in some detail. This particular described processor constitutes a part of a telecommunication system, but the reorder buffer according to the present invention is useful in many types of processors using predicted jumps.

In a central processing unit (CPU) of the processor system there are basically two large components, a signal processor unit (SPU) and an instruction processor unit (IPU). The SPU handles job level execution, in which order jobs are to be executed, and the IPU executes the programs of each job. The reorder buffer is situated in the IPU, why only the IPU will be further described. First an overview of a processor design is given, in order to define the role of the reorder buffer.

Figure 2:
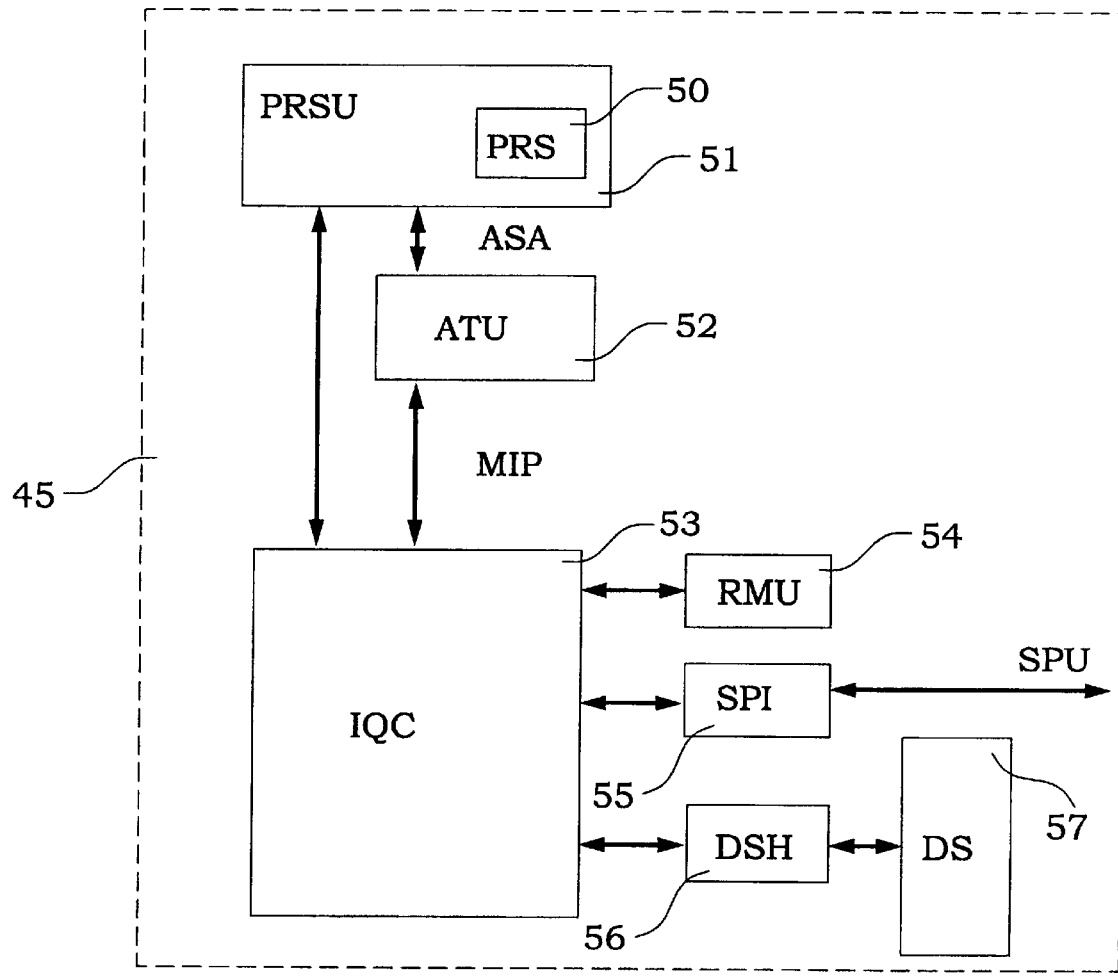
FIG. 2 is a block diagram showing an instruction processor unit, in which a reorder buffer according to the invention can be used.

FIG. 2 illustrates a schematic block diagram of an IPU in a processor 45. The processor 45 also comprises SPU (not shown) and other auxilliary units (not shown) according to the knowledge of anyone skilled in the art. However, these parts are not central for the understanding of the present invention and any conventional technology may be used. An instruction queue controller IQC 53 communicates with a SPU via a signal processor interface SPI 55. The IPU receives jobs from the SPU. The job decides what programs are going to be executed in the IPU. A program reference store unit PRSU 50 keeps track of the programs in assembler code ASA. When a program is going to be executed it is fetched from a program reference store PRS 51 together with prediction information for conditional jumps. The ASA instructions and the predictions are sent to an address translation unit ATU 52 for decoding. The ATU 52 translates assembler instructions into micro instructions MIP. The instructions are decoded and if an instruction is a conditional jump, the jump is predicted with help from the PRSU 50. The decoded micro instructions are then sent to the IQC 53.

A data store DS 57 is the memory for data in the IPU and contains all the information necessary. A data store handler DSH 56 handles the accesses to the DS 57. A register memory unit RMU 54 contains register memory and link register stacks. Registers are written and read by instructions. Also other units may be included in the IPU, but since they do not affect the operation of the reorder buffer, the description of such detail parts will be excluded.

Figure 3:
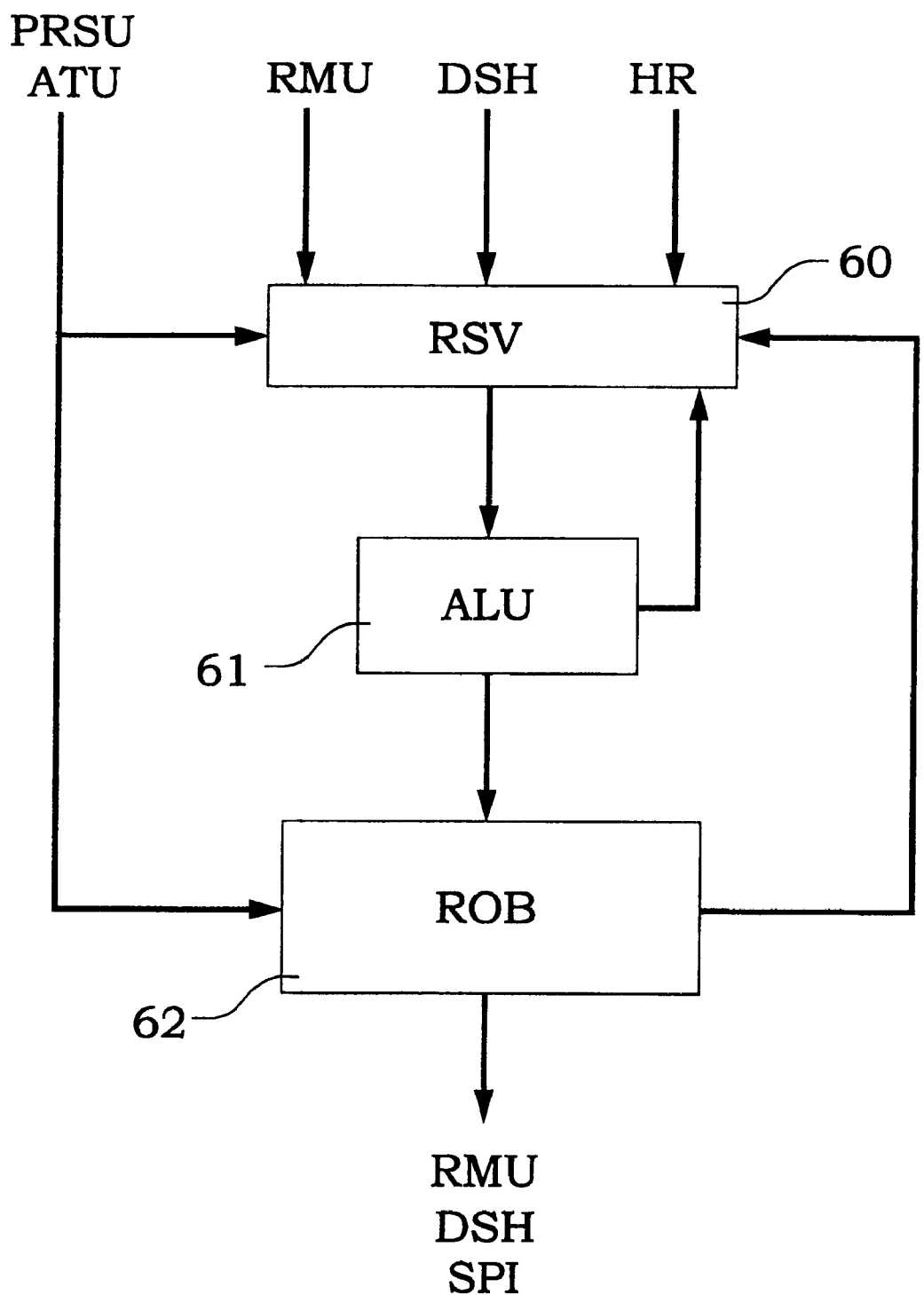
FIG. 3 is a block diagram showing an instruction queue controller, in which a reorder buffer according to the invention can be used.

FIG. 3 illustrates a simple design of a IQC. Instructions from the PRSU and the ATU are together with a unique sequence number sent to reservation stations RSV 60 and to a reorder buffer ROB 62. The RSV 60 holds the instruction until all dependencies of other results have been solved and the operands have been fetched from memory and registers. It has normally several different queues to store the different types of instructions. When an instruction has all the operands, it is sent through an arithmetic logic unit ALU 61. Operands can be received from several different sources, e.g. DSH, RMU or hardware registers and status registers HR inside the IQC.

The ALU 61 executes all different types of instructions and stores the result in the reorder buffer ROB 62, normally within one clock cycle. If an instruction in the RSV 60 needs the result from another instruction it can receive the result from the ALU 61 or directly from the reorder buffer if the result is already calculated.

The reorder buffer ROB 62 stores all instructions received from the ATU 61. When an instruction is calculated, the result is stored in the reorder buffer together with the associated instruction. When the instructions are ready they are then committed, in the same order as they were received by the reorder buffer. The reorder buffer also keeps track of the predicted jumps, and flushes the IPU if mispredicted jumps are occurring. The committing involves writing of the results in different manners, e.g. to the RMU or DSH. Results may also be sent to the SPI.

Figure 4:
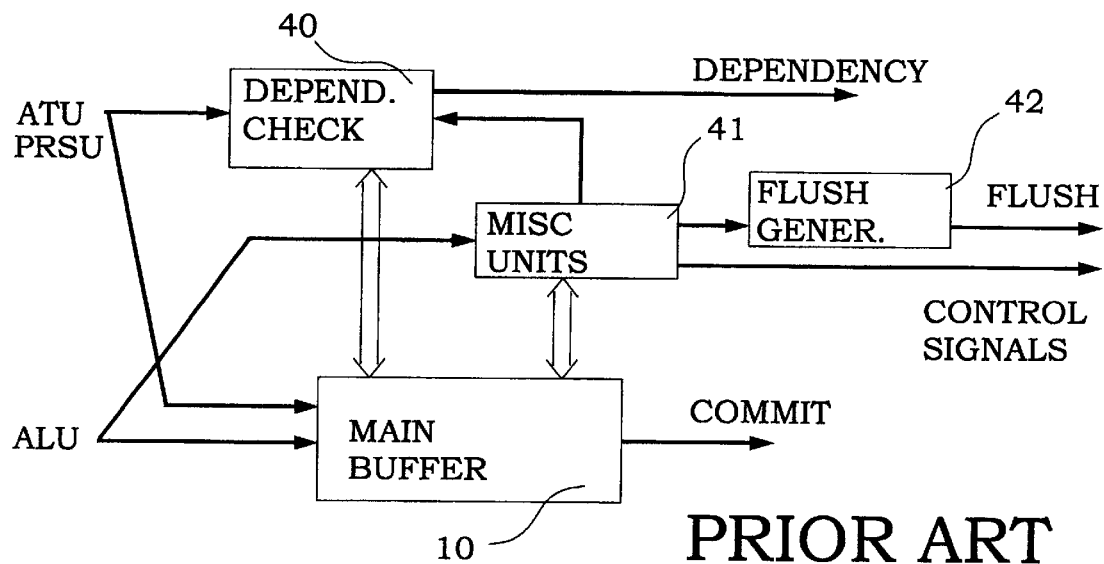
FIG. 4 is a block diagram of a reorder buffer according to the prior art.

In order to better understand the important advantages with reorder buffers according to the present invention, a description of a reorder buffer according to the prior art is included. In FIG. 4, a typical design of a reorder buffer according to prior art is disclosed. Instructions from the ATU or PRSU are received and stored in a main buffer 10, normally constituted as a firstin-first-out buffer. New instructions are inserted last into the buffer in the first empty positions, and instructions are committed from the first position. The instructions are also sent to a dependency check unit 40 for comparing the destination operands with operands of new incoming instructions. If there is a dependency, necessary information is sent to the RSV.

Results from the ALU are inserted into correct positions in the main buffer 10. A unit for miscellaneous functions 41 also receives the results from the ALU and in cooperation with the main buffer 10, it keeps track on different maintenance and control functions. The miscellaneous unit 41 is e.g. responsible for searching the main buffer for the first not reported jump instruction and the evaluation of the predicted condition, which in cases of misprediction will lead to a flush of the reorder buffer, by a flush generator unit 42. The miscellaneous unit 41 also supports the dependency check unit 40 with appropriate information.

Figure 5:
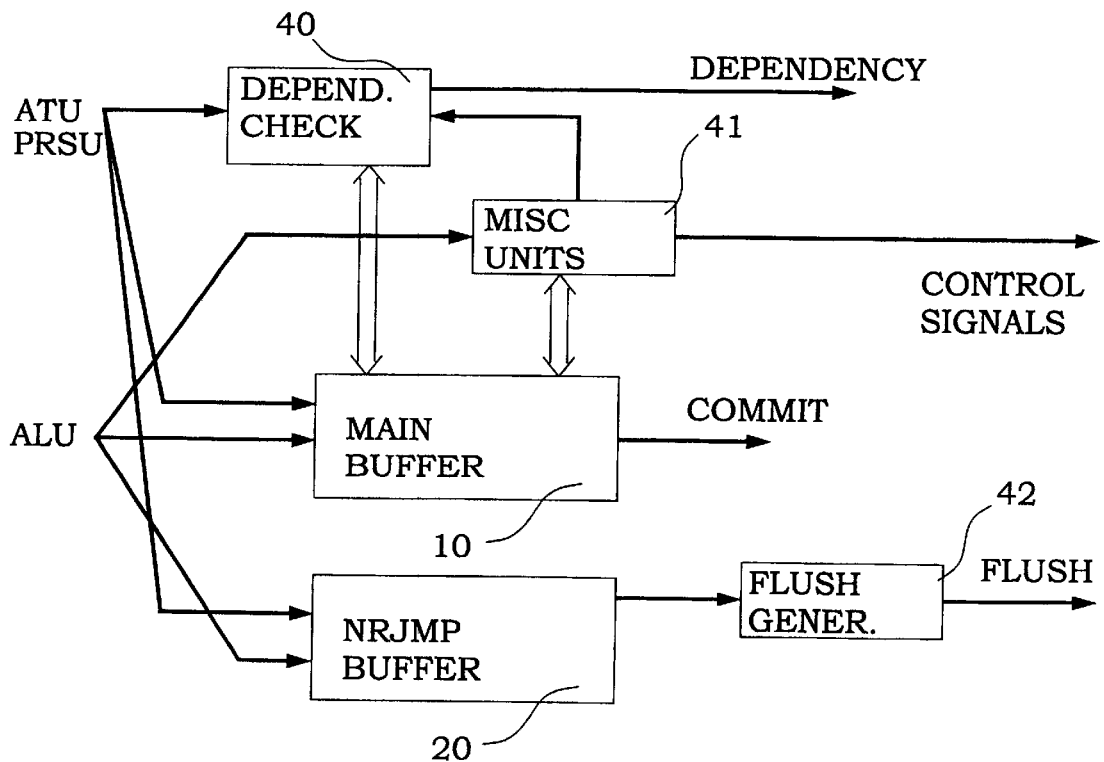
FIG. 5 is a block diagram of a first embodiment of a reorder buffer according to the present invention.

In FIG. 5, a reorder buffer according to a preferred embodiment of the present invention is illustrated. Instructions from the ATU or PRSU are received and stored in a main buffer 10, preferably constituted as a first-in-first-out buffer. New instructions are inserted last into the buffer in the first empty positions, and instructions are committed from the first position. The instructions are also sent to a dependency check unit 40 for comparing the destination operands with operands of new incoming instructions. If there is a dependency, necessary information is sent to the RSV. If the instruction from the ATU or PRSU is a predicted jump instruction, at least the sequence number and preferably also information of the condition for the jump instruction is also sent to a not reported jump buffer 20. The not reported jump buffer is preferably designed as a first-in-first-out buffer, and the new instruction is inserted into the first empty position of the buffer 20. Since only predicted jump instructions are inserted, the first position in the not reported jump buffer 20 is always occupied by the first not reported jump.

Results from the ALU are inserted into correct positions in the main buffer 10. A unit for miscellaneous functions 41 also receives the results from the ALU and in cooperation with the main buffer, it keeps track on different maintenance and control functions. The miscellaneous unit 41 also supports the dependency check unit 40 with appropriate information. The not reported jump buffer 20 is also supplied with appropriate results and is responsible for finding the first not reported jump instruction. Since this always corresponds to the instruction associated with the first position, the search is trivial and therefore extremely fast. The predicted jump condition is evaluated if the result for the predicted jump in the first position in the not reported jump buffer is available. In the case of a correct prediction, the first position of the not reported jump buffer 20 is removed and the buffer is popped. In cases of misprediction, a flush generator 42 is used to flush the reorder buffer from instructions having a sequence number larger than the jump instruction giving rise to the flush.

It would be possible to store the predicted jump instructions only in the not reported jump buffer 20, but the reporting of correct predictions will then lead to the need of incorporating the jump instruction into the middle of the main buffer 10. More preferable is thus to store only necessary information in the not reported jump buffer 20. This may leads to a double storage of certain information, if the information is a copy of the information available in the main buffer, but it is negligible in comparison with the benefit of the arrangement. As an example, assume that the main buffer 10 contains 64 positions and 5 registers of each position determining conditions of the jump, which are unnecessary if a separate buffer is used. The introduction of a separate register will thus save 320 registers. If the not reported jump buffer 20 has 10 positions occupying 50 registers each, 500 registers have to be used, i.e. 180 registers more. However, when taking into account that 50 OR-gates and 50 AND-gates per main buffer position are saved by excluding the extraction of information from the main buffer 10, a total of 3200 OR-gates and 3200 AND-gates are saved by the present invention. Furthermore, for other processors, the size of the removal of registers from the main buffer may even exceed the size of the total not reported jump buffer.

Figure 6:
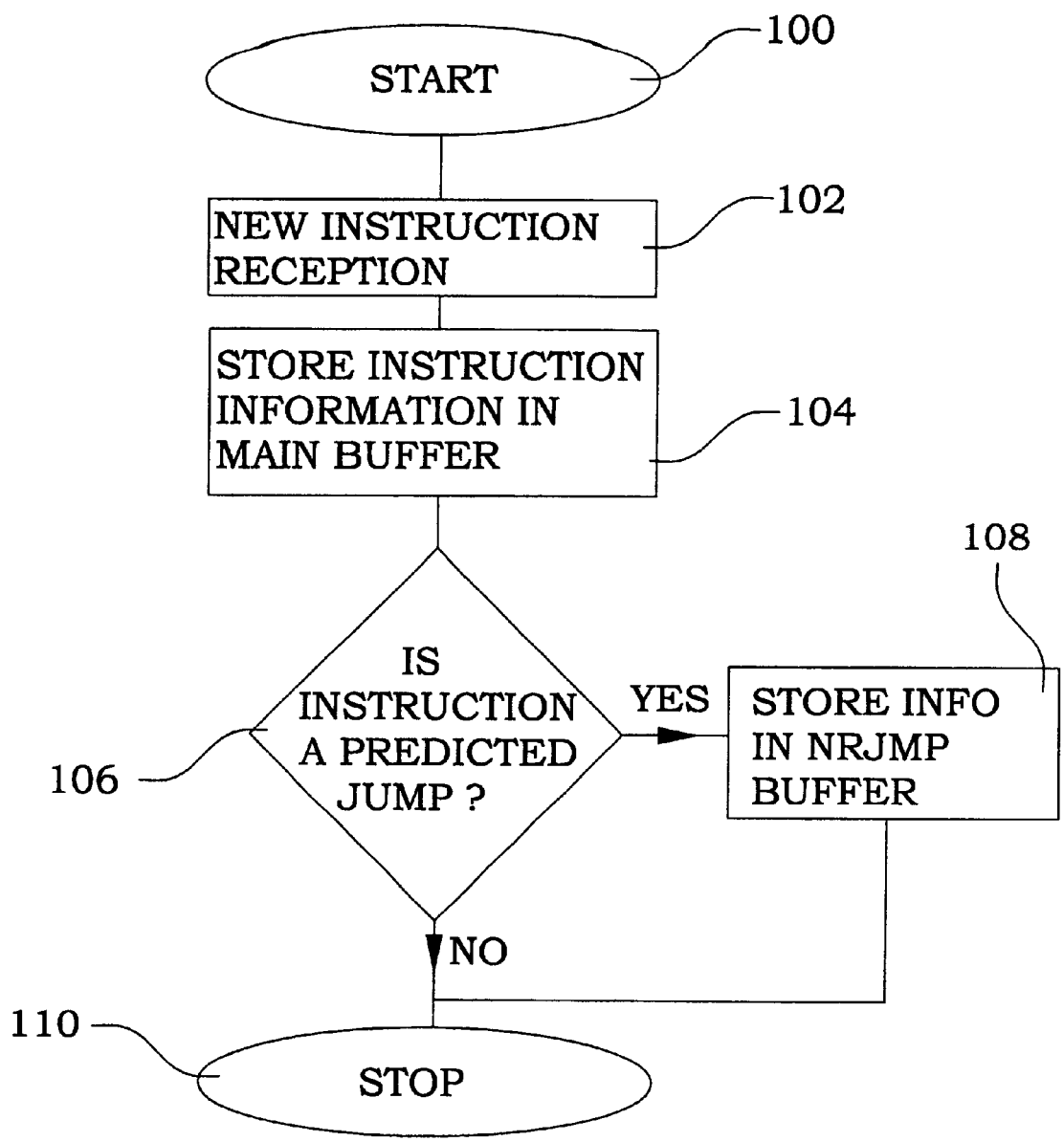
FIG. 6 is a flow diagram, illustrating the process of storing instructions in a reorder buffer according to the present invention.

The procedure for handling predicted jump instructions in a reorder buffer may be viewed as three separate part processes, dealing with storing of instructions and results, checking predictions and committing instructions. In FIG. 6, the part process of inserting instructions in the reorder buffer is illustrated. The part process starts in step 100. In step 102 a new instruction from the ATU or PRSU is received in the reorder buffer. The instruction is in step 104 stored in the main buffer. In step 106, it is decided whether or not the instruction is a predicted jump instruction. If the instruction is a predicted jump instruction, information associated with the instruction is stored in the not reported jump buffer in step 108. The information may at least to a part be a copy of information in the main buffer. The part process stops in 110.

Figure 7:
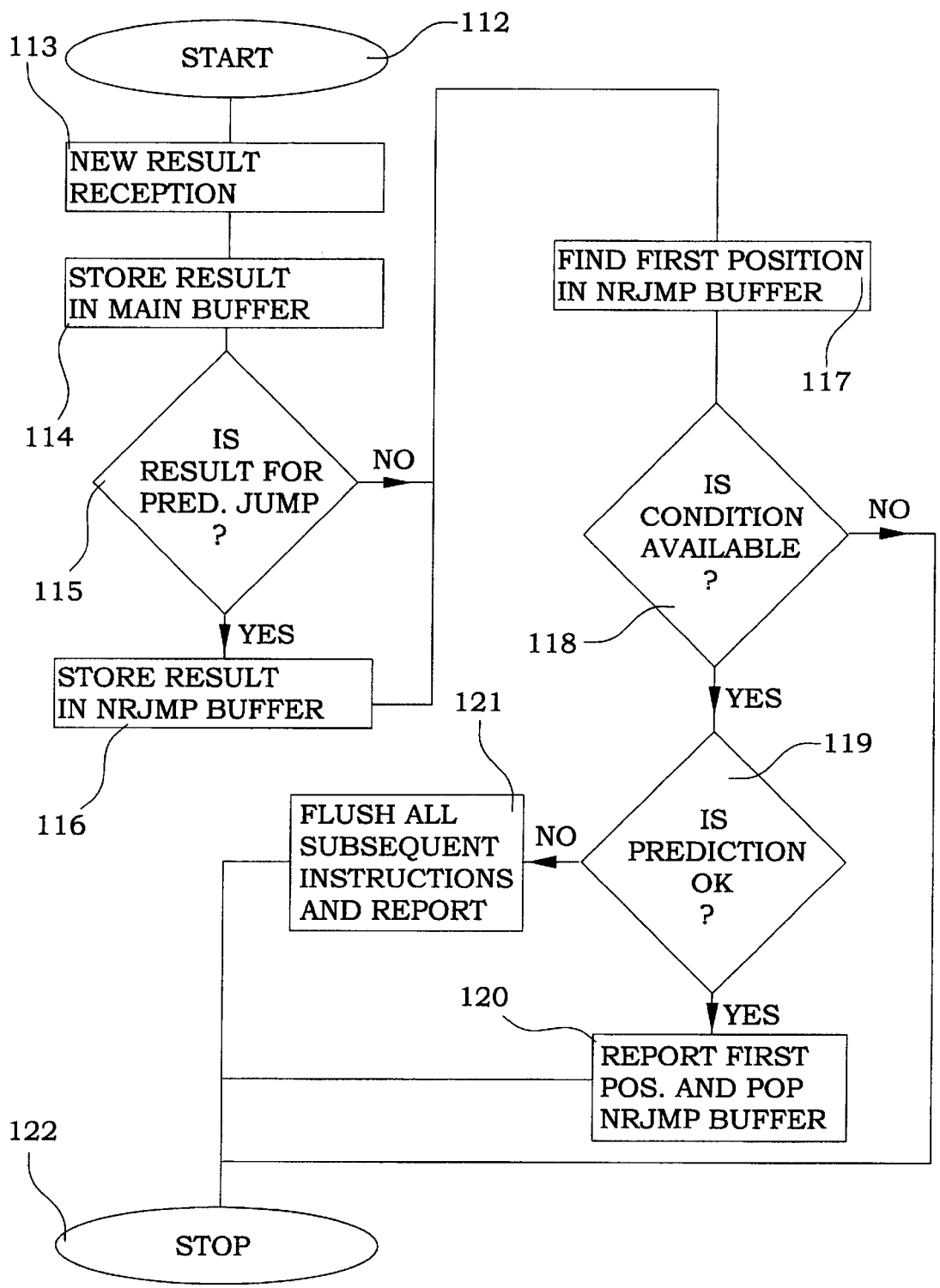
FIG. 7 is a flow diagram, illustrating the process of storing results and evaluating predicted jump conditions according to the present invention.

In FIG. 7, the part process of handling results and in particular the evaluation of the predicted jump instructions, is illustrated. This part process starts for each clock cycle in step 112. In step 113 a new result is received from the ALU. The result is stored together with the associated instruction in the main buffer in step 114. In step 115, it is decided whether or not the result was associated with a predicted jump instruction. If the result was a result of a predicted jump, the result is also stored in the not reported jump buffer in step 116. If the result was not a result of a predicted jump, the part process continues directly to step 117. In step 117 the first position of the not reported jump buffer is selected, which corresponds to the first not reported predicted jump instruction. In step 118 it is checked if the results determining the real condition of the jump is available. If they are not available, the part process is ended at 122. The validity of the prediction of the jump can then not yet be determined. If appropriate results are available, a prediction evaluation is performed in step 119. If the prediction was correct, i.e. a correct jump has been performed, the first position in the not reported jump buffer is removed in step 120 and all subsequent positions are shifted up one step, i.e. "popped". The part process then ends at 122. If a misprediction was made, i.e. the assumed jump was incorrect, a flush of the reorder buffer for instructions with higher sequence numbers is performed in step 121 together with the reporting of the present predicted jump. Since no further predicted jump instructions then are available, the part process ends in step 122.

Figure 8:
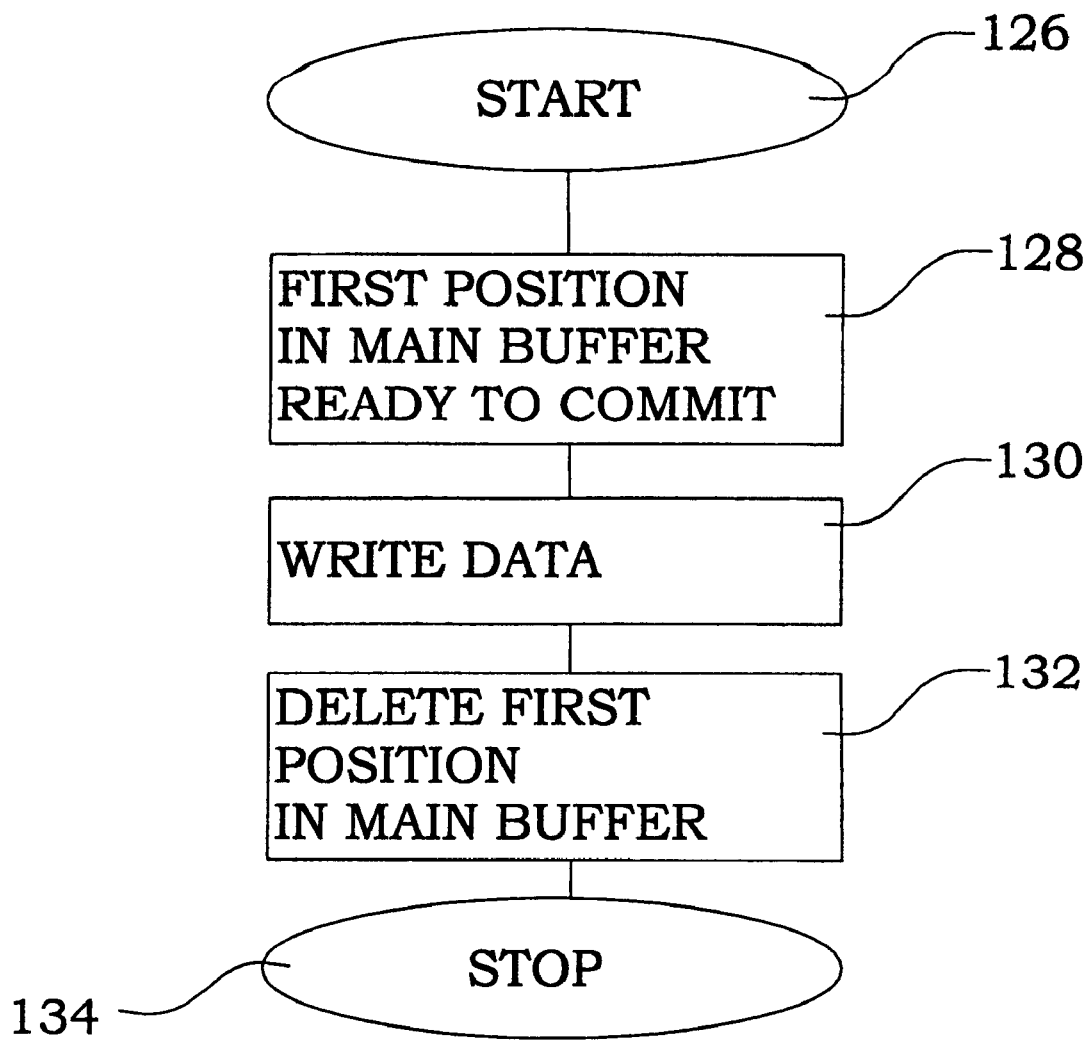
FIG. 8 is a flow diagram, illustrating the process of committing instructions from a reorder buffer.

The commit part process is not directly affected by the present invention, but for completeness of the description, it is illustrated in FIG. 8. The part process starts in step 126. In step 128, the process waits for the instruction of the first position of the main buffer to be ready to be committed. In step 130, the results of the instruction is written into appropriate memories, and in step 132, the instruction is removed from the main buffer and the subsequent instructions are shifted one step forward. The part process ends in step 134.

From the above description, the benefits of the present invention are easily understood. By extracting predicted jump related information from the main buffer already at the insertion phase, the subsequent evaluation of the predicted jumps are facilitated. The extra space needed for the not reported jump buffer is, at least to a part, compensated by a reduced need for information in the main buffer. Furthermore, additional evaluation means in the main buffer may be reduced significantly. The actual procedure of evaluation is possible to perform more rapidly, since the step of finding the first not reported predicted jump becomes trivial. This, in turn, leads to a faster overall evaluation time.

It will be understood by those skilled in the art that various modifications and changes may be made to the described embodiments of the present invention without departing from the scope thereof, which is defined by the appended claims.

What is claimed is:

1. A reorder buffer comprising:

a main buffer arranged for storage of a plurality of instructions and associated information;

an additional buffer arranged for storage of information associated with predicted jump instructions; and wherein at least a part of the content of said additional buffer also is stored in said main buffer.

2. The reorder buffer (62) according to claim 1, wherein at least a part of the content of said additional buffer (20) also is stored in said main buffer (10).

3. The reorder buffer according to claim 1, wherein said additional buffer is arranged as a first-in-first-out queue.

4. The reorder buffer according to claim 1, wherein said additional buffer has a number of positions which is considerably less than the number of positions of said main buffer.

5. The reorder buffer according to claim 4, wherein each of said positions of said additional buffer has a number of fields which is less than the number of fields in each of said positions of said main buffer.

6. The reorder buffer according to claim 1, wherein each position of said additional buffer at least comprises a sequence number associated with a predicted jump instruction.

7. The reorder buffer according to claim 6, wherein each position of said additional buffer also comprises information of the prediction used by said predicted jump instruction.

8. The reorder buffer according claim 1, wherein an output terminal of said additional buffer is connected to a flush generator unit.

9. A superscalar processor having a reorder buffer comprising:

a main buffer arranged for storage of a plurality of instructions and associated information;

an additional buffer arranged for storage of information associated with predicted jump instructions; and wherein at least a part of the content of said additional buffer also is stored in said main buffer.

10. The superscalar processor (45) according to claim 9, wherein at least a part of the content of said additional buffer (20) also is stored in said main buffer (10).

11. The superscalar processor according to claim 9, wherein said additional buffer is arranged as a first-in-first-out queue.

12. The superscalar processor according to claim 9, wherein said additional buffer has a number of positions which is considerably less than the number of positions of said main buffer.

13. The superscalar processor according to claim 12, wherein each of said positions of said additional buffer has a number of fields which is less than the number of fields in each of said positions of said main buffer.

14. The superscalar processor according to claim 9, wherein each position of said additional buffer at least comprises a sequence number associated with a predicted jump instruction.

15. The superscalar processor according to claim 14, wherein each position of said additional buffer also comprises information of the prediction used by said predicted jump instruction.

16. The superscalar processor according claim 9, wherein an output terminal of said additional buffer is connected to a flush generator unit.

17. A method for handling of predicted jumps in a reorder buffer comprising the steps of:

storing instructions and associated information in a main buffer of said reorder buffer, said instructions including predicted jump instructions;

storing information associated with predicted jump instructions in an additional buffer in said reorder buffer;

storing results of executed instructions in said main buffer;

storing results associated with predicted jump instructions in said additional buffer;

finding the oldest not reported predicted jump instruction in said additional buffer;

if said results agrees with the predictions of said oldest not reported jump instruction, reporting said oldest not reported jump instruction as correct; and if said results disagrees with the predictions of said oldest not reported jump instruction, flushing all instructions in said reorder buffer entered after said oldest not reported jump instruction.

18. The method for handling of predicted jumps according to claim 17, comprising the step of storing a copy of at least a part of the information associated a predicted jump instruction stored in said main buffer of said reorder buffer, in said additional buffer.

19. The method for handling of predicted jumps according to claim 17, comprising the step of storing a sequence number associated with a predicted jump instruction in said additional buffer.

20. The method for handling of predicted jumps according to claim 17, comprising the step of storing information of the prediction used by said predicted jump instruction in said additional buffer.

21. The method for handling of predicted jumps according to claim 17, comprising storing information in said additional buffer in a first-in-first-out manner, whereby said step of finding the oldest not reported predicted jump instruction comprises the selection of the first position in said additional buffer.

22. The method for handling of predicted jumps according to claim 17, wherein said step of reporting said oldest not reported jump instruction as correct comprises the deletion of the first position in said additional buffer.

* * * * *

UNITED STATES PATENT AND TRADEMARK OFFICE
CERTIFICATE OF CORRECTION

PATENT NO.    : 6,550,003 B1
DATED         : April 15, 2003
INVENTOR(S)   : Hans Christian Pettersson and Pär David Berglin It is certified that error appears in the above-identified patent and that said Letters Patent is hereby corrected as shown below:

<u>Column 5,</u>
Line 47, replace "firstin-first-out buffer" with -- first-in-first-out buffer" --

<u>Column 8,</u>
Lines 5-7, delete "2. The reorder buffer (62) according to claim 1, wherein at least a part of the content of said additional buffer (20) also is stored in said main buffer (10)."
Lines 35-37, delete "10. The superscalar processor (45) according to claim 9, wherein at least a part of the content of said additional buffer (20) also is stored in said main buffer (10)."

Signed and Sealed this

Second Day of September, 2003

JAMES E. ROGAN
*Director of the United States Patent and Trademark Office*